United States Patent Office 3,148,991
Patented Sept. 15, 1964

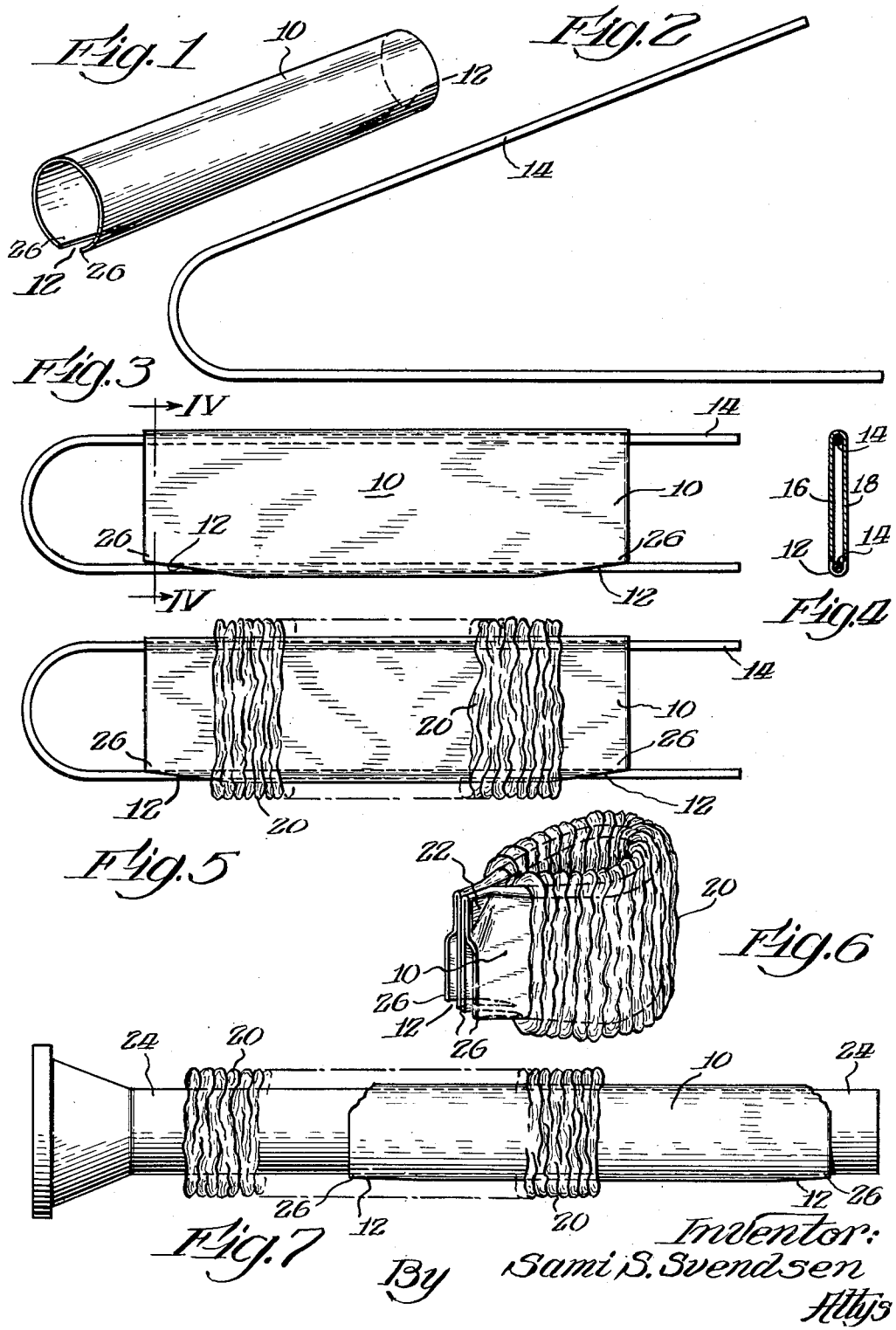

3,148,991
MEANS AND METHOD OF PACKING
SAUSAGE CASINGS
Sami S. Svendsen, Chicago, Ill., assignor to Sami S. Svendsen, Inc., Chicago, Ill., a corporation of Illinois
Filed Aug. 2, 1962, Ser. No. 214,407
3 Claims. (Cl. 99—175)

This invention relates to the preparation of natural sausage casings for shipment.

Natural sausage casings are prepared from the intestines of animals such as sheep and hogs. This preparation includes a thorough cleansing of the intestine and the removal from its surface of a certain amount of extraneous fiber. The resulting product is an extremely thin, fragile and pliable tube. Since it is composed of animal fiber, it must be preserved in order to withstand the shipment involved between such widely separated areas as Australia or New Zealand, and Europe or North America. That preservation is accomplished by salting the casings, thereby preventing the bacterial destruction which would occur in the absence of the use of any kind of preservative. One objection to this method of preservation, as it has been practiced, is that it is wasteful of salt, since an excess of salt is usually employed to assure adequate preservation of the casing.

In the past these natural sausage casings have been shipped salted down in sealed barrels. If they are placed in the barrels without any supplementary support or packaging means, the casings tend to shrivel into twisted pieces which gradually pack down within the barrel into a compacted and tangled mass. Upon arrival at the plant of the sausage maker, this mass must be untangled and washed to remove the salt, prior to use. The separating and untangling has been done by hand and the cost of manually separating the sausage casings shipped in this manner is excessively high.

In the process of separating the sausage casings one from another, they are soaked in warm water to return them to a soft, pliable condition and to remove the salt therefrom. When such a casing has been prepared for use, it is shirred over a stuffing horn and the ground meat is forced into the casing to form the sausage.

One means suggested to improve the packaging for shipment of natural sausage casings has been to shirr them over paper tubes for the purpose of maintaining the casing in a less twisted and tangled condition. However, paper tubes tend to disintegrate and break up during the shipping and are not satisfactory.

It has also been suggested that the casings be shirred over a wooden mandrel for the purpose of preventing their becoming twisted and tangled during shipment. However, this is expensive as a matter of purchasing the mandrel and also as a matter of shipping the wood, to be discarded at the termination of the shipment.

It has also been suggested to shirr the casing over a polyethylene tube containing water or a stiffener and to pack a small number of the thus prepared casings and tubes in small packages. This has the disadvantage of the cost of the package plus the cost of shipping the water or the stiffener.

In accordance with this invention, the natural sausage casing is shirred over an open-ended thin, flexible tube, formed of a material such as polyethylene, the tube having inserted within it a temporary spreader means such as a U-shaped spring. With the spreader means inserted in the tube, the tube is stretched to its maximum width and assumes a relatively flat shape rather than its natural circular cross section shape. The casing may then be shirred over the tube in a relatively easy manner without tearing the casing, and the casing is stretched to a corresponding flat shape. With the spreader, tube and casing thus assembled, the unit is salted to preserve the casing. The casing remains in the salt, usually for a few hours or overnight, and assumes a "set" by reason of the drying action of the salt. Upon removal, the loose salt is shaken from the casing and the temporary spreader means is removed, leaving the thin, flexible tube within the casing. The tube and casing are then bent into a circular form and the ends of the tube are joined together, as by heat-sealing. During the period of transportation the individual casings will not become compacted into the tangled mass as heretofore, but will remain relatively free from one another. On receipt by the sausage manufacturer, the casing and tube can be soaked, the tube and casing pulled over a stuffing horn and then the tube removed, leaving the casing shirred on the stuffing horn.

There are many advantages in the use of this means and method of preparing natural sausage casings for shipment. The thin, flexible tube member is very inexpensive, light weight and therefore inexpensive to ship, and is disposable at its destination. It is formed with longitudinal slits at each which facilitate drawing the tube over a stuffing horn. The temporary spreading or stiffening member, which is much more expensive and heavier, is removed prior to shipment and reused.

Additionally, the preforming of the casing during the preservation operation and forming the tube into a loop causes the casings to retain their shape in transit. They do not become tangled with each other, thereby obviating the laborious and expensive separation operation by the sausage manufacturer.

Also, less salt may be used in the curing process, which results in a saving in the purchase of the salt.

It is therefore an object of this invention to provide a light weight inexpensive member stretched on a temporary spreader member, and upon which natural sausage casings may be mounted for preforming during the preservation operation.

A further object of this invention is to provide a thin, flexible tube over which a casing is shirred, the tube being joined in a loop with the casing mounted thereon, the tube additionally being provided with slits at its extremities to provide gripping means to facilitate pulling the tube over a stuffing horn.

Another object of this invention is to provide a method of preparing natural sausage casings for shipment which method involves the use of inexpensive light weight and disposable components which accompany the casing in shipment and the use of a temporary shaper means which is removed from the casing prior to shipment, which shaper means may be reused in the practice of the method.

A still further object of this invention is to provide a method of preparing natural sausage casings for shipment which method permits the use of less salt in the preservation of the casings than is customarily used in connection with other methods.

In the accompanying drawings,

FIG. 1 is a view in perspective of a thin, flexible tube adapted to be inserted into and shipped with a natural sausage casing;

FIG. 2 is a view in elevation showing a temporary spreader means, here shown as a U-shaped spring member, adapted for insertion within the tubular member shown in FIG. 1;

FIG. 3 is a view in elevation showing the spreader means of FIG. 2 assembled inside the tubular means of FIG. 1;

FIG. 4 is a view in cross section on the line IV—IV of FIG. 3;

FIG. 5 is a view in elevation showing the assembled tube and spreader means of FIG. 3 with a natural sausage casing shirred thereover;

FIG. 6 is a view in perspective showing the unit ready for shipment, the ends of the tube having been secured together, and FIG. 7 is a view in elevation with some parts broken away showing the tubular member pulled part way onto a stuffing horn and the casing partly shirred off the tubing and onto the stuffing horn.

In the practice of this invention the natural sausage casings are first cleaned so as to be suitable for use with food designed for human consumption. The casings are thoroughly washed and extraneous fibrous material is removed therefrom. The resulting product is very pliable, thin and subject to tearing if roughly handled or if it encounters sharp objects. In this pliable condition it can be readily shirred over another object. A casing, which in its extended condition is many feet long, can be supported on a member of relatively short length.

As shown in the drawings, the thin, flexible tubular member 10 is preferably formed of a synthetic film material, such as polyethylene. The specific requirements for the material of which the tubing is formed are that it be flexible under normal conditions, that it be impervious to any destructive action because of its exposure to salt, and that it have a low co-efficient of friction so that the natural sausage casings can be removed from the tubular member 10 without injury to the casings.

The tubular member 10 may be of any convenient length, although it has been found that a tube of approximately ten inches in length is very satisfactory. A slit 12 is cut in the material of the tube, adjacent each of its ends to form a gripping portion. This slit may be die cut, and preferably is formed by removing a triangle approximately two inches long and one-fourth inch wide from each end of the tubular member 10.

The temporary spreader means 14 shown in FIG. 2 as a U-shaped spring, functions, when inserted within the tubular member 10 as shown in FIG. 3, to substantially flatten the tubular member 10 by stretching it to its full lateral width. The spreader is inserted in such a fashion that the slits 12 are preferably adjacent one of the arms of the spreader member 14. As shown in FIG. 4, this will provide a shape in which the wall of the tubing 10 will form two relative parallel sidewall areas 16 and 18. With the spreader means 14 inserted in the tubing 10, as shown in FIG. 3, and having the cross sectional shape shown in FIG. 4, a natural sausage casing 20 may be shirred over the assembled tube and spreader, as shown in FIG. 5.

In performing the method for preparing natural sausage casings for shipment, a spreader member 14 is inserted within a tubular member 10 substantially as shown in FIG. 3 and a clean natural sausage casing 20 is shirred over that assembly, as shown in FIG. 5. The assembly shown in FIG. 5 is then packed in sufficient salt to preserve the casing 20 for the duration of the expected time in transit. The period of salting varies from a few hours to overnight. During the salting process the casing 20 shrinks and assumes a flattened shape which substantially conforms to the cross sectional shape of the tube 10 and spreader member 14, as shown in FIG. 4.

Following the salting process, the casing, tube and spreader are removed, the loose salt shaken off, and may be reused. At this point the temporary spreader 14 is removed from the tube 10. The casing 20 will have assumed a set, and it is not necessary to ship the spreader 14 with it, thereby conserving shipping space and saving weight. The tube 10 is then formed into a loop and its ends joined together at 22, as by heat sealing. It is not necessary to seal the entire circumference of the tube, but only enough to retain the tube in a loop during shipment, thereby preventing the natural casing 20 from slipping off the tubular member 10.

When the casings arrive at the sausage maker's plant, they are removed from the packing container, and soaked in warm water in the usual way to remove the salt. The tubing 10 is partially pulled over a stuffing horn 24, by grasping loose corners 26 and the heat seal is then broken. The loose corners 26, adjacent the slits 12, provide convenient gripping areas which facilitate the pulling of the tubing 10 over the end of the stuffing horn 24. Also, the flattened shape of the tubing 10 and the casing 20 assists in pulling the tubing 10 over the stuffing horn 24. The casing 20 is then pushed further over the horn, and the tubing 10 is pulled off and discarded. The end of the casing 20 is then pushed a short distance over the end of the horn 24 and prepared to receive the sausage stuffing.

Having described the means and method for preparing sausage casings for shipment, what is claimed as new is:

1. Means for preparing natural sausage casings for shipment comprising a tubular member formed of a thin, flexible sheet material which is relatively impervious to salt-type preservatives, and a U-shaped spring inserted within said tubular member to spread said tubular member laterally into a substantially flattened condition.

2. A method for preparing natural sausage casings for shipment comprising the steps of assembling a natural sausage casing over the outside of a thin, flexible tubular member, inserting a U-shaped spring inside the thin, flexible tubular member to spread said tubular member into a substantially flattened shape, treating said sausage casing with a preserving agent, and removing said U-shaped spring prior to packing said sausage casing and tubular member for shipment.

3. A method for preparing natural sausage casings for shipment comprising the steps of assembling a U-shaped spring inside a thin, flexible tubular member to stretch said tubular member diametrically into a substantially flattened shape, inserting the assembly of said spring and said tubular member into a clean natural sausage casing so that the tubular member projects from both ends of said sausage casing, treating said sausage casing with a preserving agent, and removing said spring from said tubular member prior to packing said sausage casing and tubular member for shipment.

References Cited in the file of this patent

UNITED STATES PATENTS

| 489,468 | Dillingham | Jan. 10, 1893 |
|---|---|---|
| 1,282,761 | Combes | Oct. 29, 1918 |
| 2,262,551 | Kirgan | Nov. 11, 1941 |
| 3,064,803 | Eichin et al. | Nov. 20, 1962 |
| 3,115,240 | Flomen et al. | Dec. 24, 1963 |

FOREIGN PATENTS

| 480,960 | Canada | Feb. 12, 1952 |
|---|---|---|
| 537,706 | Canada | Mar. 5, 1957 |